US006829527B2

(12) United States Patent
Felke et al.

(10) Patent No.: US 6,829,527 B2
(45) Date of Patent: Dec. 7, 2004

(54) RELATIONAL DATABASE FOR MAINTENANCE INFORMATION FOR COMPLEX SYSTEMS

(75) Inventors: Timothy J. Felke, Glendale, AZ (US); David M. Kolbet, Glendale, AZ (US); Michael W. Stinson, Glendale, AZ (US); John F. Stone, Mesa, AZ (US); Jeff J. van der Zweep, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/228,622

(22) Filed: Aug. 26, 2002

(65) Prior Publication Data

US 2004/0039499 A1 Feb. 26, 2004

(51) Int. Cl.[7] .............................. G06F 19/00; G01M 1/00
(52) U.S. Cl. .............................. 701/29; 701/33; 701/35; 707/102
(58) Field of Search ............................ 701/29, 33, 35, 701/3; 714/25, 26; 707/10, 100, 102, 104

(56) References Cited

U.S. PATENT DOCUMENTS

| | | | |
|---|---|---|---|
| 5,408,412 A | | 4/1995 | Hogg et al. |
| 5,552,984 A | * | 9/1996 | Crandall et al. .............. 701/31 |
| 5,919,267 A | * | 7/1999 | Urnes et al. .................. 714/26 |
| 5,922,079 A | * | 7/1999 | Booth et al. .................. 714/26 |
| 6,014,598 A | * | 1/2000 | Duyar et al. .................. 701/29 |
| 6,208,955 B1 | * | 3/2001 | Provan et al. ................ 703/20 |
| 6,253,147 B1 | | 6/2001 | Greenstein ................... 701/202 |
| 6,574,537 B2 | * | 6/2003 | Kipersztok et al. ........... 701/29 |
| 6,625,569 B2 | * | 9/2003 | James et al. ................. 702/183 |

FOREIGN PATENT DOCUMENTS

| | | |
|---|---|---|
| EP | 1072991 A2 | 1/2001 |
| EP | 1079204 A1 | 2/2001 |
| GB | 2312518 A | 10/1997 |

OTHER PUBLICATIONS

Adams, T. et al, "Integrating Haterogeneous Aviation Logistics Applications using a Knowledge Brokered Architecture," Proceedings of the IASTED International Conference: Software Engineering and Applications, Las Vegas, NV, USA, Nov. 6–9, 2000, pp. 211–217.

Sudolsky, Michael D., "Enhanced C–17 O–Level QAR Data Processing and Reporting," 1997 IEEE Autotestcon Proceedings, Anaheim, CA, USA, Sep. 22–25, 1997, pp. 44–51.

* cited by examiner

Primary Examiner—Tan Q. Nguyen

(57) ABSTRACT

A relational database is for relating maintenance information that differs for each of a plurality of complex systems, such as a plurality of differing aircraft, using a common database structure so as to facilitate maintenance procedures for the plurality of complex systems. The database structure comprises: a plurality of primary entities for providing a fault model description of each of the plurality of complex systems, the fault model description including, for each of the plurality of complex systems, failure modes, symptoms and data required to effect a repair; and a categorical entity corresponding to a complex system, such as an aircraft, that enables selection of the fault model description corresponding to the complex system or aircraft. The relational database is particularly suited for use in or by an aircraft maintenance and diagnostic system that assists with fault correction for a fault condition within an aircraft based on a fault model for the aircraft.

23 Claims, 10 Drawing Sheets

OBSERVATIONS ← 103

- ID: UNIQUE IDENTIFIER, EASILY INDEXED
- COMMON_KEY: GLOBAL IDENTIFIER, INDICATING ITS SOURCE, NOT EASILY INDEXED
- OBSV_CODE: CODE FOR OBSERVATION FOR OPERATOR USING REPORTING GUIDE OR AUTOMATIC REPORTING FROM MONITORING SYSTEM
- FAULT_MODEL: IDENTIFIER FOR THE APPLICABLE EQUIPMENT TYPE (FAULT MODEL)
- CHANGE_PACKAGE: IDENTIFIER FOR THE CHANGE PACKAGE THAT PRODUCED THIS ENTITY
- SYSTEM_CODES: LIST OF SYSTEMS FOR WHICH THIS OBSERVATION IS RELEVANT
- EFF_TAGS: LIST OF EFFECTIVITY TAGS FOR WHICH THIS OBSERVATION IS RELEVANT
- KEY_WORDS: LIST OF KEY WORDS THAT INDEX THIS ENTRY

FIG. 2

FAULT CODES ← 105

- ID: UNIQUE IDENTIFIER, EASILY INDEXED
- COMMON_KEY: GLOBAL IDENTIFIER, INDICATING ITS SOURCE, NOT EASILY INDEXED
- FAULT_CODE: CODE FOR FAULT CODE FOR OPERATOR USING REPORTING GUIDE
- TITLE: TITLE FOR THE FAULT CODE WHEN VIEWED BY USER
- OBS_LIST: LIST OF OBSERVATIONS FOR THIS FAULT CODE
- OBS_COUNTS: CO-OCCURRENCE COUNT OF EACH OBSERVATION WITH THE FAULT CODE
- FAULT_MODEL: IDENTIFIER FOR THE APPLICABLE EQUIPMENT TYPE (FAULT MODEL)
- CHANGE_PACKAGE: IDENTIFIER FOR THE CHANGE PACKAGE THAT PRODUCED THIS ENTITY
- SYSTEM_CODES: LIST OF SYSTEMS FOR WHICH THIS FAULT CODE IS RELEVANT
- EFF_TAGS: LIST OF EFFECTIVITY TAGS FOR WHICH THIS FAULT CODE IS RELEVANT
- KEY_WORDS: LIST OF KEY WORDS THAT INDEX THIS ENTRY

FIG. 3

{ ISOLATION PROCEDURES ← 109
- ID:              UNIQUE IDENTIFIER, EASILY INDEXED
- COMMON_KEY:      GLOBAL IDENTIFIER, INDICATING ITS SOURCE, NOT EASILY INDEXED
- TITLE:           TITLE FOR THE ISOLATION PROCEDURE WHEN VIEWED BY USER
- OUTCOME_LIST:    LIST OF OUTCOMES FOR THIS ISOLATION PROCEDURE
- DOC_REFS:        LIST OF DOCUMENT ELEMENTS DESCRIBING THE ISOLATION PROCEDURE
- FAULT_MODEL:     IDENTIFIER FOR THE APPLICABLE EQUIPMENT TYPE (FAULT MODEL)
- CHANGE_PACKAGE:  IDENTIFIER FOR THE CHANGE PACKAGE THAT PRODUCED THIS ENTITY
- SYSTEM_CODES:    LIST OF SYSTEMS FOR WHICH THIS ISOLATION PROC IS RELEVANT
- EFF_TAGS:        LIST OF EFFECTIVITY TAGS FOR WHICH THIS ISOLATION PROCEDURE IS RELEVANT
- KEY_WORDS:       LIST OF KEY WORDS THAT INDEX THIS ENTRY }

FIG. 5

{ OUTCOMES ← 111
- ID:              UNIQUE IDENTIFIER, EASILY INDEXED
- COMMON_KEY:      GLOBAL IDENTIFIER, INDICATING ITS SOURCE, NOT EASILY INDEXED
- TITLE:           TITLE FOR THE OUTCOME WHEN VIEWED BY USER
- RP_LIST:         LIST OF REPAIRS FOR THIS OUTCOME
- RP_COUNT:        CO-OCCURRENCE COUNT OF EACH REPAIR WITH THE OUTCOME
- IP_LIST:         LIST OF ISOLATION PROCEDURES ASSOCIATED WITH THIS OUTCOME
- FAULT_MODEL:     IDENTIFIER FOR THE APPLICABLE EQUIPMENT TYPE (FAULT MODEL)
- CHANGE_PACKAGE:  IDENTIFIER FOR THE CHANGE PACKAGE THAT PRODUCED THIS ENTITY
- EFF_TAGS:        LIST OF EFFECTIVITY TAGS FOR WHICH THIS OUTCOME IS RELEVANT }

FIG. 6

DOCUMENT ELEMENTS ← 121

- ID: UNIQUE IDENTIFIER, EASILY INDEXED
- COMMON_KEY: GLOBAL IDENTIFIER, INDICATING ITS SOURCE, NOT EASILY INDEXED
- TITLE: TITLE FOR THE DOCUMENT ELEMENT WHEN VIEWED BY USER
- SUPL_LIST: LIST OF SUPPLEMENTAL DOCUMENTS FOR THIS DOCUMENT ELEMENT
- SUPC_LIST: LIST OF SUPERCEDING DOCUMENTS FOR THIS DOCUMENT ELEMENT
- DOCUMENT: IDENTIFIER OF THE DOCUMENT TO WHICH ELEMENT BELONGS
- FAULT_MODEL: IDENTIFIER FOR THE APPLICABLE EQUIPMENT TYPE (FAULT MODEL)
- CHANGE_PACKAGE: IDENTIFIER FOR THE CHANGE PACKAGE THAT PRODUCED THIS ENTITY
- SYSTEM_CODES: LIST OF SYSTEMS FOR WHICH THIS DOCUMENT ELEMENT IS RELEVANT
- EFF_TAGS: LIST OF EFFECTIVITY TAGS FOR WHICH THIS DOC ELEMENT IS RELEVANT
- KEY_WORDS: LIST OF KEY WORDS THAT INDEX THIS ENTRY

FIG. 11

DOCUMENTS ← 123

- ID: UNIQUE IDENTIFIER, EASILY INDEXED
- COMMON_KEY: GLOBAL IDENTIFIER, INDICATING ITS SOURCE, NOT EASILY INDEXED
- TITLE: TITLE FOR THE DOCUMENT WHEN VIEWED BY USER
- REVISION: TEXTUAL DESCRIPTION OF REVISION DATE AND VERSION
- LOCATOR: THE URL LOCATION FOR THE DOCUMENT AND ITS ELEMENTS
- INVOCATION: TEXTUAL SCRIPT FOR OPENING A SECTION OF THE DOCUMENT
- FAULT_MODEL: IDENTIFIER FOR THE APPLICABLE EQUIPMENT TYPE (FAULT MODEL)
- CHANGE_PACKAGE: IDENTIFIER FOR THE CHANGE PACKAGE THAT PRODUCED THIS ENTITY

FIG. 12

{ EQUIPMENT  ← 125

- ID:             UNIQUE IDENTIFIER, EASILY INDEXED
- COMMON_KEY:     GLOBAL IDENTIFIER, INDICATING ITS SOURCE, NOT EASILY INDEXED
- TITLE:          TITLE FOR THE EQUIPMENT WHEN VIEWED BY USER
- REG_NUM:        REGISTRATION NUMBER FOR THE EQUIPMENT
- DOCUMENT_LIST:  LIST OF ALL DOCUMENTS APPLICABLE FOR THE EQUIPMENT
- FAULT_MODEL:    IDENTIFIER FOR THE APPLICABLE EQUIPMENT TYPE (FAULT MODEL)
- CHANGE_PACKAGE: IDENTIFIER FOR THE CHANGE PACKAGE THAT PRODUCED THIS ENTITY
- EFF_TAGS:       LIST OF EFFECTIVITY TAGS RELEVANT FOR THIS EQUIPMENT }

FIG. 13

{ EFFECTIVITY TAGS  ← 127

- ID:             UNIQUE IDENTIFIER, EASILY INDEXED
- COMMON_KEY:     GLOBAL IDENTIFIER, INDICATING ITS SOURCE, NOT EASILY INDEXED
- TITLE:          TITLE FOR THE EFFECTIVITY TAG WHEN VIEWED BY USER
- FAULT_MODEL:    IDENTIFIER FOR THE APPLICABLE EQUIPMENT TYPE (FAULT MODEL)
- CHANGE_PACKAGE: IDENTIFIER FOR THE CHANGE PACKAGE THAT PRODUCED THIS ENTITY
- KEY_WORDS:      LIST OF KEY WORDS THAT INDEX THIS ENTRY }

FIG. 14

{ THESAURUS ENTRIES  ← 129

- KEY_WORD:       A WORD OR PHRASE USED IN TEXT LOOKUP
- SYNONYM_LIST:   LIST OF EQUIVALENT THESAURUS ENTRIES
- CHANGE_PACKAGE: IDENTIFIER FOR THE CHANGE PACKAGE THAT PRODUCED THIS ENTITY }

FIG. 15

RELATIONAL DATABASE FOR MAINTENANCE INFORMATION FOR COMPLEX SYSTEMS

FIELD OF THE INVENTION

This invention relates to maintenance and service of complex systems and more specifically a relational database and structure thereof for maintenance information for use in maintenance of such systems.

BACKGROUND OF THE INVENTION

Complex systems comprising tens or hundreds of inter-related and inter-operating systems and subsystems, many which may be complex in there own right, present unique maintenance and service challenges. Examples of such complex systems include factories, major buildings, ocean-going vessels, power generation plants, and aircraft to name a few. Complex systems and the inter-related and inter-operational nature of the systems and subsystems thereof often require equally complex and disciplined maintenance and service programs. These maintenance and service programs usually include documentation or records of observed or indicated irregularities or discrepancies and actions taken or services performed pursuant to resolution or prevention of such irregularities and discrepancies. This documentation is usually filled out, completed, or recorded by service and maintenance personnel. Expert systems and tools that can standardize service and maintenance documentation, diagnoses, procedures, cost estimates and so on are highly desirable for the time savings and precision they can offer to an overall maintenance and operational support program.

In the aircraft industry, for example, Fault Models have more recently been developed as a means to assist with maintenance of an aircraft. A Fault Model is a set of data items that represent the elements of a complex system, such as an aircraft, their failure modes, the symptoms produced by those failure modes and other information as required to allow an automated reasoning system to use the data to assist maintenance personnel in the maintenance and correction of operational discrepancies of the complex system. Fault Models have been successfully produced as a bi-product of the engineering development of a new system. For example, this was accomplished for the Boeing 777 Aircraft. The 777 Engineering Development process included significant additional controls to ensure that fault isolation data was captured in a structure that allowed the production of an accurate fault model. Development of earlier aircraft as well as the development of most other complex systems did not include a rigorous approach to the capture of fault isolation data. The 777 Fault model has significant limitations not the least of which is that it only works for 777 aircraft. A typical US airline will have several major fleets, such as a Boeing 757 and Airbus A320 fleets, and a dozen or more sub-fleets, such as 757-27A and 757-27B sub-fleets. In addition, the configuration of the aircraft changes over time to incorporate safety, reliability and passenger comfort improvements.

Furthermore the 777 Model offers little or no guidance with respect to fault isolation, does not handle updates to the equipment in an orderly fashion, and does not assist maintenance personnel in generating structured inputs, among others. Clearly a need exists for relational databases and structures thereof that are broadly applicable to differing complex systems, such as different aircraft, for assistance with maintenance of the complex systems.

SUMMARY OF THE INVENTION

The present invention in varying scope is a relational database for relating maintenance information that differs for each of a plurality of complex systems using a common database structure so as to facilitate maintenance procedures for the plurality of complex systems. One aspect of the invention is a computer based aircraft maintenance and diagnostic system for assistance with fault correction for a fault condition within an aircraft based on a fault model for the aircraft, the system utilizing an inventive embodiment of a relational database.

In one aspect a relational database is defined for relating maintenance information that differs for each of a plurality of complex systems, such as a plurality of different aircraft, using a common database structure so as to facilitate maintenance procedures for the plurality of complex systems. The database structure comprises: a plurality of primary entities for providing a fault model description of each of the plurality of complex systems, the fault model description including, for each of the plurality of complex systems, failure modes, symptoms and data required to effect a repair; and a categorical entity corresponding to a complex system that enables selection of the fault model description corresponding to the complex system. The categorical entity may further include a complex system type and a set of tags that cross reference relevant information within the plurality of primary entities that correspond to the complex system type or a thesaurus entity that facilitates a user's interface to the relational database by providing a relationship between words used interchangeably in complex system maintenance. This arrangement and common database structure advantageously provides a new fault model description for a new complex system by entering only new information corresponding to the new complex system in the plurality of primary entities and the categorical entity.

In further detail the plurality of primary entities may further include one or more of: an observation entity that includes one of a user reported and automatically reported indication of a problem indexed to an observation code; a fault code entity including a fault code for each distinct set of observation codes that indicate a problem with a system of the complex system; a subsystem entity that includes a subsystem corresponding to one or more fault codes and one of a corresponding list of repairs, list of isolation procedures, and list of deferral procedures, the subsystem entity may be further arranged to consolidate a plurality of fault codes and when each fault code results in the same maintenance procedure indicating that maintenance procedure without resolving a specific fault code; a isolation entity including isolation procedures each having one or more outcomes; or an outcome entity having outcomes with each of the outcomes associated with one isolation procedures and one or more repairs wherein an interactive process of performing isolation procedures with resultant outcomes will resolve the one or more repairs to a specific repair.

In differing scope a relational database is defined for relating maintenance information that differs for each of a plurality of complex systems using a common database structure so as to facilitate maintenance procedures for the plurality of complex systems. Here the database structure comprises: a categorical entity corresponding to a complex system that enables selection of a fault model description corresponding to the complex system; and a plurality of primary entities for providing the fault model description corresponding to the complex system selected according to the categorical entity from a plurality of fault model descriptions of the plurality of complex systems, the plurality of fault model descriptions including, for each of the plurality of complex systems, failure modes, symptoms and data required to effect a repair; wherein the plurality of primary entities facilitate classification of a fault condition and then fault isolation and repair procedures to correct the fault condition. The plurality of primary entities may further include one of a procedure entity and a document reference entity that correlate with known maintenance procedures. The categorical entity may further include a thesaurus entity that facilitates conversion of unstructured user inputs into structured inputs or a change package entity that identifies a set of changes for the complex system and optionally controls when the set of changes becomes active for the complex system.

In another inventive aspect an aircraft maintenance and diagnostic system is defined for assistance with fault correction for a fault condition within an aircraft based on a fault model for the aircraft. The system comprises: a user interface; a computer, coupled to the user interface, having a processor and memory for storing software instructions and a relational database; the processor executing the software instructions to process information to facilitate the identification and correction of the fault condition within the aircraft according to a fault model defined by the relational database where the relational database is defined above.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 2 to FIG. 18 depict, for the entities shown in the entity relationship diagram of FIG. 1, preferred data dictionaries according to the present invention.

DETAILED DESCRIPTION OF PREFERRED EMBODIMENT

Figure 1:
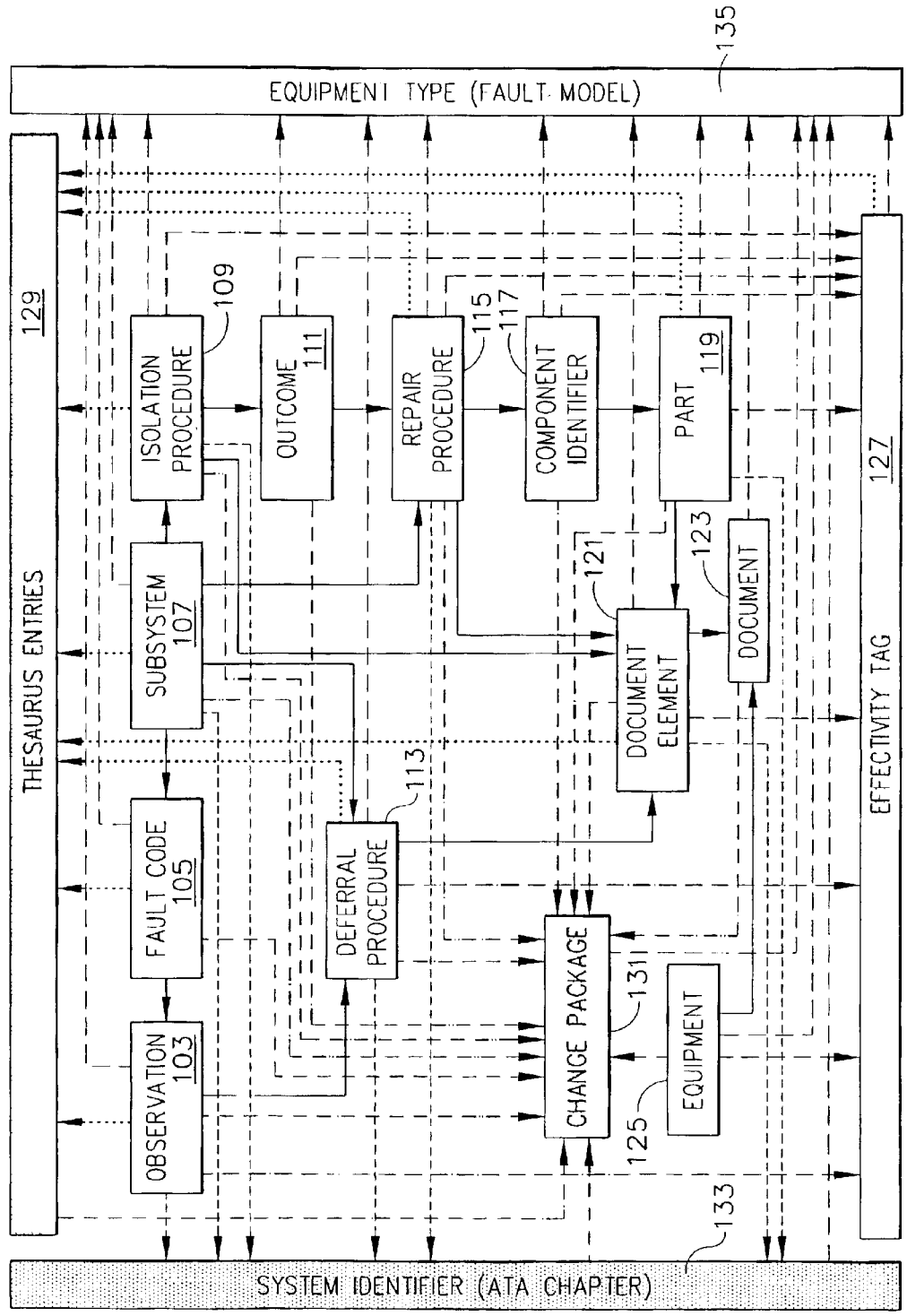
FIG. 1 depicts an entity relationship diagram of a preferred relational database structure for assistance in maintenance activities for a complex system according to the present invention.

In overview form the present disclosure concerns and relates to systems for service, maintenance, and diagnostic support of complex systems and more specifically the disclosure relates to an inventive relational database and structure thereof for relating maintenance information that differs and evolves for each of a plurality of complex systems using a common database structure as well as methods and apparatus using the relational database for assisting with fault diagnoses and correction for fault conditions or failure modes within such differing and evolving complex systems. More particularly various inventive concepts and principles embodied in the relational database and structure thereof providing for or allowing efficient and systematic fault correction for complex systems are discussed. The complex systems of particular interest are those associated with aircraft, however the concepts and principles discussed herein will be equally applicable to other complex systems such as those noted earlier.

As further discussed below various inventive principles and combinations thereof are advantageously employed to facilitate maintenance procedures and activities, specifically including fault diagnoses or classification, fault isolation, and fault repair in a manner that incorporates and thus learns from historical diagnostic, classification, or isolation information, such as previous activities regarding similar fault conditions or failure modes. This data is, preferably, incorporated into fault models for the relevant and differing and evolving complex systems, thus alleviating various problems, such as imprecise service and maintenance actions and descriptions, inflexibility or lack of adaptability, and the excess costs associated with known maintenance systems while still facilitating quality service, maintenance, and diagnostic activities and more precise labor, time, and cost estimates that will result from the more systematic isolation of faults and thus forecasts of requisite repairs and actions that are enabled by appropriate and consistent procedures.

The instant disclosure is provided to further explain in an enabling fashion methodologies and techniques for making and using various embodiments in accordance with the present invention as well as the best modes of practicing the invention as contemplated by the inventor. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, in the interest of brevity and minimization of any risk of obscuring the principles and concepts according to the present invention, further discussion of such software, if any, will be limited to higher level principles and concepts as employed or applied to or by the preferred embodiments.

In the interest of developing some common conventions we will briefly review fault models and fault classification and isolation conventions. A Fault Model for an aircraft or other complex system, preferably, is a relational database that identifies the failure modes of the aircraft and the symptoms that each failure mode or fault condition produces. The symptoms are defined as either Observations or Test Results. Observations are the set of symptoms that are readily apparent to a technician without running a test procedure or attaching supplemental equipment, such as the test cart, to the aircraft or other complex system. Test Results are the set of symptoms that can only be discovered by running a test procedure or attaching supplemental equipment to the aircraft. Fault Classification only uses Observations to determine the Fault Code. An inventive method and apparatus for fault classification is disclosed in co-pending patent application titled METHOD AND APPARATUS FOR IMPROVING FAULT CLASSIFICATIONS by Felke et al. assigned to the same assignee as here and bearing, which application is incorporated herein by reference in its entirety. As noted earlier fault codes are a means to summarize the set of symptoms or syndrome reported for each distinct fault condition or failure mode. Given a previously and properly determined fault code, fault isolation uses test results to determine the best repair sequence and methodology. An inventive method and apparatus for fault Isolation is disclosed in co-pending patent application titled METHOD AND APPARATUS FOR IMPROVING FAULT ISOLATION by Felke et al. assigned to the same assignee as here and bearing, which application is incorporated herein by reference in its entirety. The above co-pending applications discuss the use of a relational database in the complex system maintenance field.

Referring to FIG. 1 an entity relationship diagram of a preferred relational database structure for assistance in maintenance activities for a complex system will be discussed and described. Initially we will review some important aspects required of a relational database for storing and relating maintenance information for differing and evolving complex systems. Various economic and regulatory considerations constrain the structure of a relational database for assisting with maintenance activities. Such a database is sometimes referred to as a Fault Model. The more significant constraints and some reasons therefore with respect to the structure of the relational database are listed below in the context of the aircraft industry. Operators of a fleet of Aircraft (or other collection of complex systems) need a relational database that provides functional and operational commonality across their entire fleet. The structure of the database or fault model must provide an efficient mechanism to represent small variations in individual aircraft (or other instances of the system being maintained) when the individual instances are part of a larger set of instances that are substantially the same (as in a fleet of aircraft that are the same model but all have different modification levels applied).

The structure of the database or fault model should support a two-step maintenance program, where the first step is the classification of the fault condition in order to determine its severity and operational impact and the second step is fault isolation and thus repair or correction of the fault condition. The structure of the database should facilitate or identify the minimum amount of data collection required by the operator in order to support the classification and isolation activities in order to minimize the corresponding operational costs. The structure of the relational database or fault model should have a high degree of correspondence or correlation with the existing maintenance procedures and maintenance program conceptual entities in order to minimize its cost of introduction and to ensure regulatory compliance for all activities recommended by the diagnostic system based on the model.

The structure of the relational database or fault model must allow for efficient generation of user interactions and provide assistance to the user to convert their unstructured observations regarding the nature of a fault condition into structured data that can be used for accurate fault diagnosis, reliability analysis and the prioritization of operational improvement programs. The structure of the Fault Model should allow for efficient production of the fault model data from engineering data, historical data and/or existing maintenance procedures. The structure of the fault model or relational database should allow for efficient automated update based on actual operational experience. The structure of the fault model should provide for efficient manual update based on changes to the configuration of the system being maintained or the recognition by the operator of a need for greater diagnostic accuracy for part of the system. The structure of the relational database should allow for control of the revision of its contents and the ability to synchronize the fault model with changes to source maintenance manuals and engineering data.

Referring to FIG. 1 and the high level entity relationship diagram for the relational database structure depicts a mechanism for relating maintenance information in a digital representation of failure modes of the system to be maintained, the symptoms of those failure modes and the operational restrictions associated with each failure mode during the period while it is being corrected. The entities of the structure that provide storage for this type of data are referred to as primary entities. The relational database organization or structure also includes entities that organize the information in the primary entities by categorizing them by their applicability to differing types of equipment, organizing them through a system hierarchy and providing key-word indices to simplify user access. The entities of the structure that provide storage for this type of data are referred to as categorical entities. In FIG. 1, the categorical entities include the entities designated with reference numerals 127–135 while the others are primary entities. The connecting lines in FIG. 1 show the relationships between the entities where the differences in line style are merely to aid in following the lines from one entity to another. Generally the arrowheads in FIG. 1 point toward the subservient one of the entities although numerous exceptions can be identified.

The relational database shown in FIG. 1 is for relating maintenance information that differs for each of a plurality of complex systems, such as different aircraft or different versions of an aircraft using a common database structure so as to facilitate maintenance procedures for the plurality of complex systems. The relational database and structure thereof includes or comprises a plurality of primary entities for providing a fault model description of each of the plurality of complex systems, where the fault model description includes, for each of the plurality of complex systems, failure modes, symptoms and data required to effect a repair; and a categorical entity corresponding to each one of the complex systems where selecting the appropriate value for this categorical entity enables selection of the fault model description corresponding to the appropriate one of the complex systems. Next we will describe and briefly discuss the various primary entities, their purpose and their structure. It is important to recognize that the primary entities provide storage for a fault model description of the failure modes of the plurality of differing and evolving complex systems to be maintained, their symptoms and the additional data, such as documents, etc. required to minimize the operational impact of the failure and correct it as efficiently as possible.

More specifically, FIG. 1 shows an Observations entity 103 that includes readily available indicators of a problem, including warning messages displayed via a computer system and indications that were felt, heard or visually observed. All Observations in the system are stored in a set of relational tables with the properties noted in FIG. 2. From the FIG. 2 data dictionary for observation entity 103, each observation will include an easily indexed ID or user identifier, a common key that is a global identifier that indicates the source of the particular observation, an observation code that is a standardized code associated with each observation reported manually by the operator or automatically via an onboard monitoring system, a fault model identifier for the particular equipment type, a change package identifier for the change package or equipment revision that produced the specific observation, list of systems within the particular equipment for which this observation is relevant, list of effectivity tags applicable for this observation, as well as key words that may be used to index this observation. Note that the meaning of some of the terms above will become clear with the discussions below. The reader will note many of the above relationships and more by a cursory review of the lines in the FIG. 1 entity relationship diagram.

Another entity is a Fault code entity 105 that stores various fault codes that each represents a distinct set of observations that indicate a specific problem within a particular system for one or more equipment types. Each fault code must have a unique set of one or more observations associated with it. For some types of complex systems, such as certain aircraft, the fault codes are often explicitly listed in the maintenance manuals. For other types of aircraft, Fault Codes are derived based on the sets of symptoms that result in distinct maintenance actions. All Fault Codes in the system are stored in a set of relational tables with the properties shown in the data dictionary of FIG. 3. The FIG. 3 data dictionary for the Fault code entity 105 includes many of the same or analogous properties including the ID, common key, fault model, change package, system codes, effectivity tags, and key words. In addition a descriptive title for the user to view is included along with a listing of observations for the fault code and a co-occurrence count of the number of times each observation has occurred with this fault code.

Figure 4:
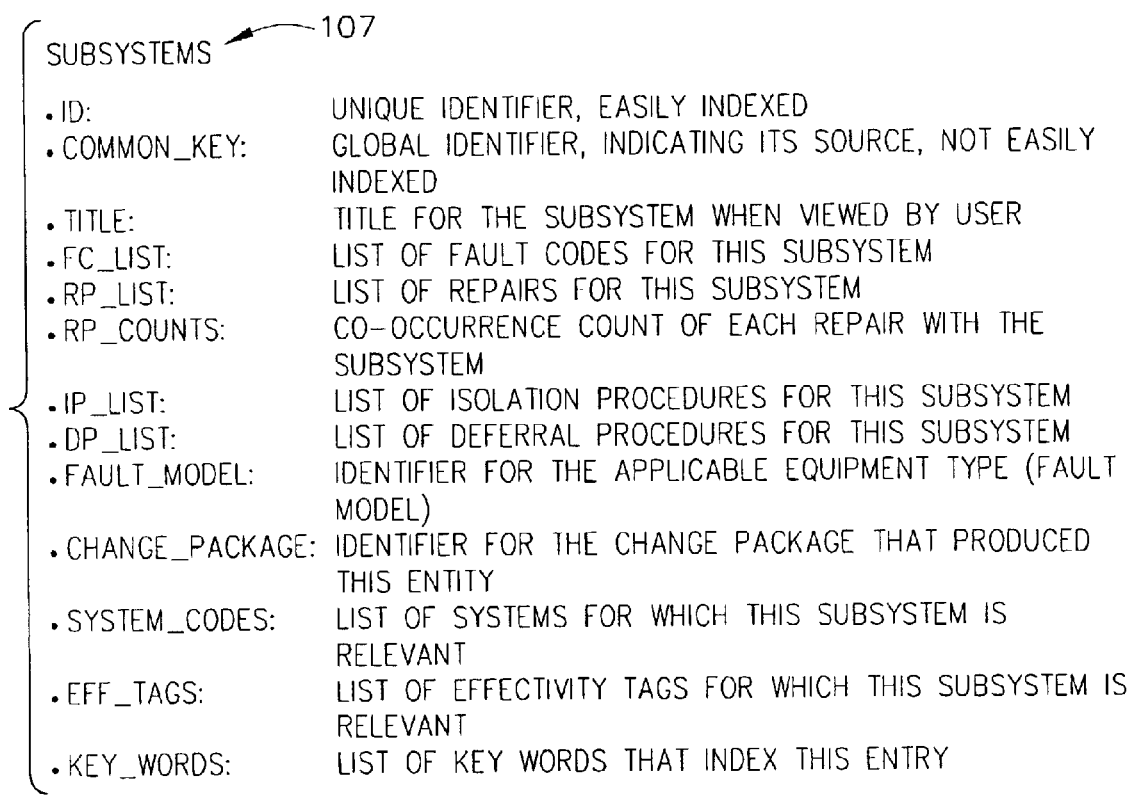

Another primary entity in the relational database depicted in FIG. 1 is a subsystem entity 107. The subsystem entity stores a plurality of subsystems where each refers to an individual functional system within a fault model to which troubleshooting can easily be applied to find and repair a problem or fault. Each subsystem can be associated with 1 or more fault codes. Each subsystem can be used to consolidate several fault codes. Advantageously when all or many of these fault codes result in the same maintenance activity, such as a repair or other outcome, the relational database or interface thereto will suggest to the operator that this maintenance activity be undertaken without finally resolving the fault code (finally classifying the underlying fault condition). A sub system is associated with all known repair procedures that have the possibility of fixing the problem in the system. A sub system may be associated with one or more deferral procedures that can defer repairs on sub system until a later time. A subsystem may also be associated with isolation procedures that can be used to reduce a list of possible repairs down to one specific repair. All subsystems in the system are stored in the subsystem entity 107 in a set of relational tables or data dictionary with the properties noted in FIG. 4. The FIG. 4 data dictionary for the subsystem entity 107 includes many of the same or analogous properties noted above including the ID, common key, descriptive title, fault model, change package, system codes, effectivity tags, and key words. In addition a listing of fault codes (FC_List) for each subsystem, a list of repairs (RP_List) for the subsystem, co-occurrence count of each repair with the subsystem, a list of isolation procedures corresponding to the subsystem, and a list of deferral procedures for the subsystem.

A further primary entity is an Isolation procedures entity 109. Isolation procedures are testing procedures and the like that are used by sub systems to reduce a list of many possible repair procedures to 1 or more specific repair procedures that must be completed to fix a problem in the complex system or aircraft. The isolation procedures as will be further noted below are not only listed for each subsystem but are modeled with possible outcomes. Each isolation procedure can be associated with one or more sub systems. An isolation procedure will also be associated with one or more outcomes, which indicate possible results of the testing indicated by the isolation procedure. An isolation procedure may also be linked to many outcomes indicating that a different isolation procedure referencing the current isolation procedure is the next step in troubleshooting the problem. Every isolation procedure must be associated with at least one Effectivity tag. An isolation procedure may have one or more document references associated with it. All Isolation Procedures in the system are stored in a set of relational tables with the properties indicated in the data dictionary for Isolation Procedures depicted in FIG. 5. The data dictionary of FIG. 5 shows many of the same or analogous properties noted above in addition to an outcome list corresponding to each isolation procedure and a list of document reference describing or relevant to the isolation procedure.

An additional primary entity that is part of the modeling associated with the isolation procedures entity 109 as alluded to above is an outcome entity 111. An outcome is a point within an isolation procedure where enough information has been gathered on the fault condition or problem to exit that isolation procedure. There may be several possible outcomes for each isolation procedure. The first is "No Fault Found", which indicates that the current procedure did not find a problem in the system being tested. This outcome can indicate that there is no problem in the system, however it usually eliminates a single isolation procedure from troubleshooting a problem, thereby eliminating that isolation procedures repairs from the list of possible repairs for the system. The second outcome type is recommending another isolation procedure be run to further reduce the set of repairs. The final outcome type indicates a specific set of one or more repairs that can be used to fix the problem or fault condition in the system. Every outcome must be associated with at least one Effectivity tag. All outcomes in the system are stored in a set of relational tables with the properties noted in the FIG. 6 data dictionary for the outcome entity 111. In addition to various same or analogous properties noted above and depicted in FIG. 6 the outcome entity 111 includes a list of repairs for each outcome, a co-occurrence count of each repair for each outcome, and a list of isolation procedures associated with each outcome.

Figure 7:
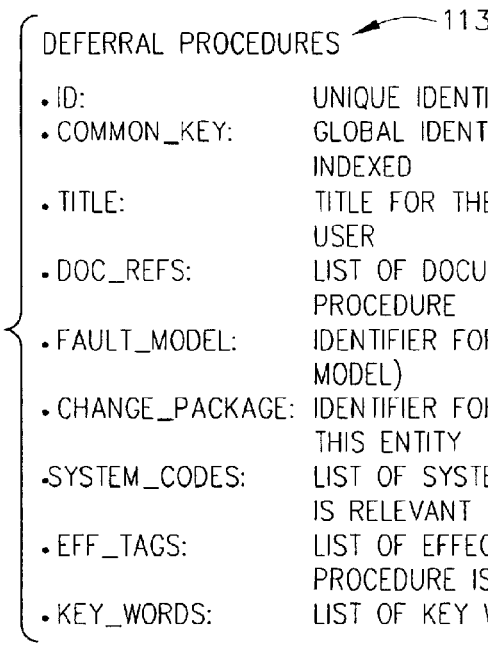

A further primary entity shown in FIG. 1 is a deferral procedures entity 113. This entity stores deferral procedures where a deferral procedure is a procedure that defers some maintenance activity or repair and thus enables the continued operation, possibly under restrictions, of a system or aircraft without fixing the underlying fault condition in the system. A deferral procedure typically also includes a time limit for how long the equipment can be operated without correcting the underlying problem. Deferral procedures can be associated with an observation or a subsystem. A Deferral Procedure will usually have an associated document reference. A deferral procedure must be associated with at least one Effectivity tag. All deferral procedures in the system are each stored in a set of relational tables with the properties noted in the FIG. 7 data dictionary for the deferral procedure entity 113. Besides the various same or analogous properties noted earlier and depicted in FIG. 7, the deferral procedure list relevant document elements describing the each particular deferral procedure.

Figure 8:
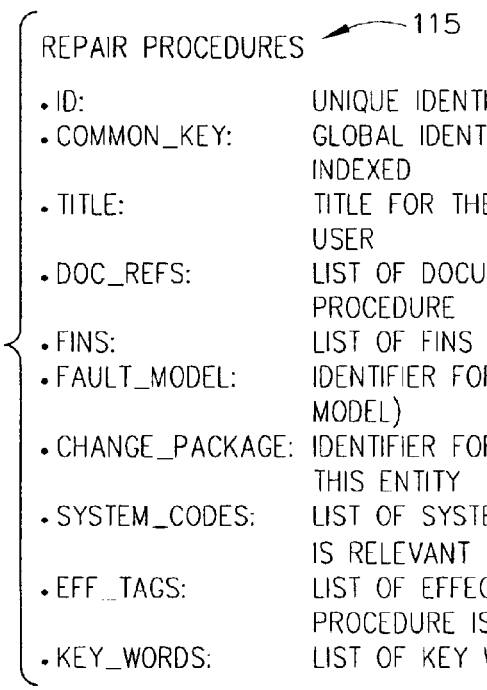

The next primary entity for the relational database is a repair procedure entity 115. Each repair procedure is a specific procedure used to resolve a problem or part of a problem in a system. A repair procedure may be associated with one or more of each of the following: Outcomes, FINs, sub systems and document references found at the respective entities. A repair procedure must be associated with at least one Effectivity tag. All Repair Procedures in the relational database and structure thereof are each stored in a set of relational tables with the properties shown in the FIG. 8 data dictionary for the repair procedure entity 115. In addition to the various same or analogous properties noted earlier and depicted in FIG. 8, the repair procedure entity includes document references describing each repair procedure and a list of FINS (location for a component) associated with each repair procedure.

Figure 9:
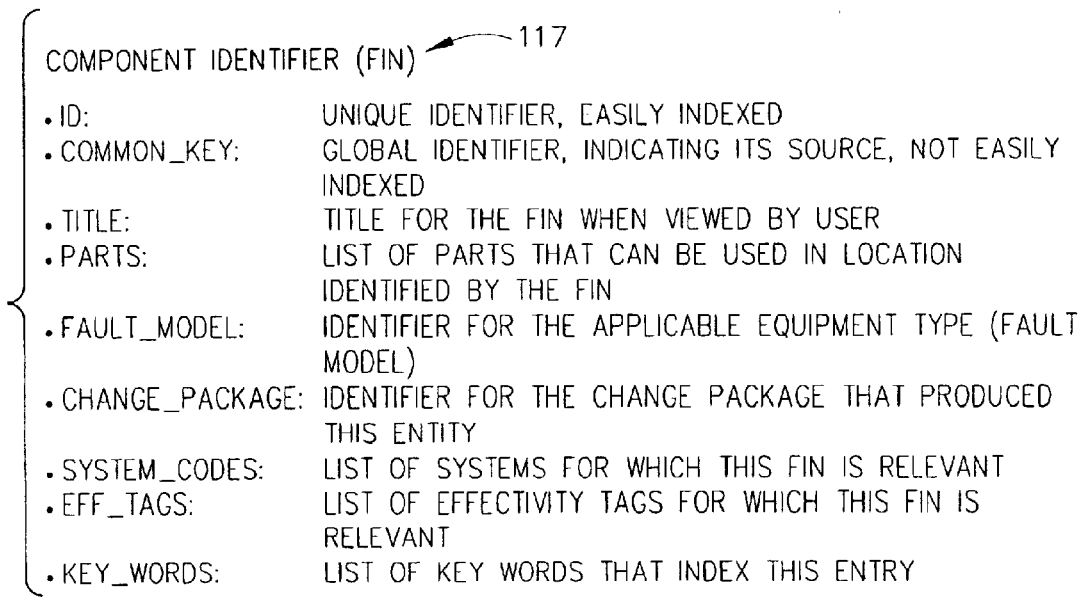

Another primary entity is a Component Identifier entity, or FIN, where each FIN is a codified representation of a location for a component within the complex system. A FIN differs from a Part in that a FIN identifies the location for a part for which several different versions of the part, possibly from different manufacturers are acceptable. An example of a FIN from common experience is the air-conditioning unit on a home. The architectural drawings for the home will include details concerning the required capacity and overall configuration of the unit but will not typically include a specification of a single manufacturer or model. A FIN can be associated with one or more repair procedures. FINs are associated with repair procedures that reference them for servicing or replacement. A FIN must be associated with at least 1 part (see below) and a FIN must be associated with at least one Effectivity tag. All FINs in the system are stored in a set of relational tables with the properties shown in the FIG. 9 data dictionary for the Component Identifier entity 117. In addition to the various same or analogous properties noted earlier and depicted in FIG. 9, the Component Identifier entity 117 includes a parts list or list of part that can be used in the location identified by the FIN.

Figure 10:
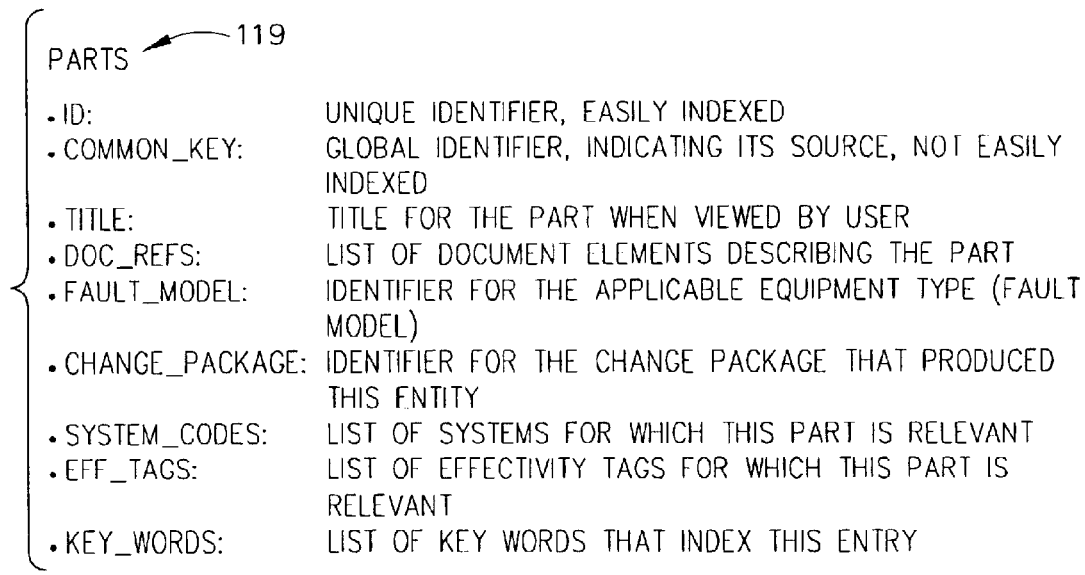

A primary entity in FIG. 1 is the Parts entity 119. The parts entity includes or represents the parts or components that go into the locations identified by FINS. The same location can often fit parts supplied by multiple suppliers or multiple versions of a part from a single supplier. A different manufacturer generally makes each different part for a given location. A given part can also be used in multiple locations within the system. A part must have at least one of each of the following: FIN, document reference and Effectivity tag. All Parts in the system are stored in a set of relational tables with the properties shown in the FIG. 10 data dictionary for each component within the parts entity 119. The data dictionary of FIG. 10 explains the various properties for the parts entity 119

A further primary entity, shown in FIG. 1, is a Document Elements entity 121. Document elements are used to link fault model entities to sections of a maintenance or operational document. Nearly all maintenance actions on safety critical systems such as aircraft are tightly controlled through the maintenance documents. The cross referencing of all maintenance actions to their controlling documents is a highly desirable feature of any maintenance support system for safety critical systems. A document element may have one or more superceding document references. A superceding document reference is one that replaces the prior one in whole. The old document reference should no longer be used. A document reference may have one or more supporting document references. A supporting document reference is one that provides additional information in conjunction with the prior document reference. A document reference must have at least one Effectivity tag. All Document Elements in the system are stored in a set of relational tables with the properties shown in the FIG. 11 data dictionary for each document element with the entity 121. A document element includes in addition to the various other same or analogous properties a list of superceding documents and supplemental documents and an identifier for the document to which the document element belongs.

An additional primary entity, in FIG. 1, is a Documents entity 123 that is used to store programmatic and configuration management information about maintenance and operational documents. Document entities record programmatic information about how to open the viewer for the document and how to navigate to the Document Elements contained by the Document. Document entities also record configuration data such as the version number of the document and its effective date. All Documents in the system are stored in a set of relational tables with the properties depicted in the FIG. 12 data dictionary for each document. As noted in FIG. 12, in addition to the various same or analogous properties the data dictionary for the documents entity 123 includes revision information for each relevant document, location information, and invocation strings for opening a section of the document.

The final primary entity, shown in FIG. 1, is an Equipment entity 125. The equipment entity is used to identify the top-level assemblies that are maintained by the operator. For an airline, the aircraft as identified by tail number for example, are the entries in the Equipment tables. One and only one Fault Model governs each piece of equipment. Equipment information is used to identify the Effectivity Tags that are valid for that piece of equipment. All Equipment entities in the system are stored in a set of relational tables with the properties shown in the data dictionary of FIG. 13.

This discussion concerns the remaining entities, shown in FIG. 1, specifically the categorical entities, their purpose and their structure. It is important to recognize the categorical entities provide storage for a set of entities that categorize the fault model or relational database with respect to the equipment to which each primary entity is applicable, the key-words used to support entity look-up, and the change package data that is used to control the revision to the primary entities.

One categorical entity is an Effectivity Tags entity that provides a mechanism for categorizing the elements of the relational database that are applicable for each complex system or aircraft. The effectivity tags entity 127 (see FIG. 1) allows multiple systems that are essentially the same, but have minor differences in configuration to be placed in the same relational database or fault model. Each Effectivity Tag also records the equipment identifiers for which it is valid. The accessors or users that retrieve data from the fault model always include an identifier of the Equipment ID for the request. The equipment ID is used to find all of the effectivity tags for the equipment that are then used to identify the primary elements from the fault model that are valid for that equipment. All Effectivity Tags in the system are stored in a set of relational tables with the properties indicated in the FIG. 14 data dictionary for the effectivity tags entity. The depicted data dictionary in view of the above discussion is self-explanatory.

Further included, as a categorical entity is a thesaurus entity 129 as shown in FIG. 1. The Thesaurus entity records the relationship between words and abbreviations that are used synonymously in the maintenance environment. These entities are linked to the various elements of the relational database or fault model in order to support a search function that allows the user to enter a description of the item they need using words that may or may not match the words used to name the corresponding fault model items. All Thesaurus Entries in the system are stored in a set of relational tables with the properties shown in the FIG. 15 data dictionary for the thesaurus entity 129. These properties as shown include a synonym list of equivalent entries, key words for text lookup, and the change package that produced the thesaurus entity.

Figure 16:
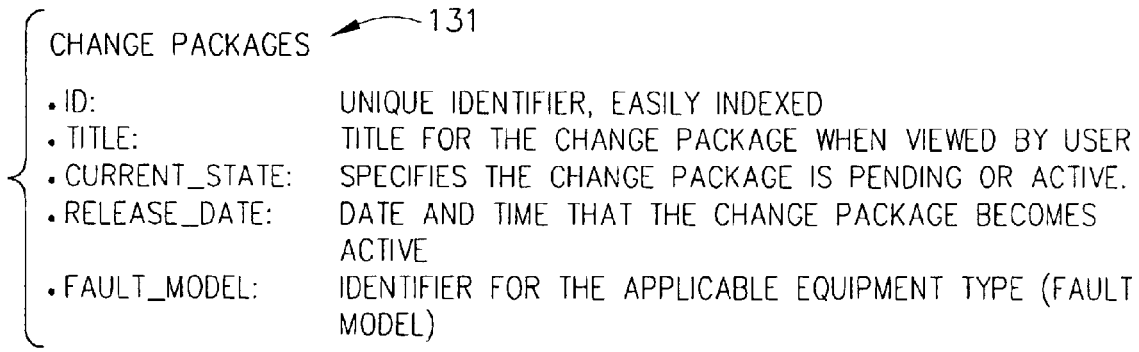

The relational database of FIG. 1 also contains a categorical entity known as a change package entity 131. The change package entity includes information that allows each entity to track its derivation from source data or its creation by an author. This information allows elements to be modified in their source location (a technical manual for example) and have those changes propagate into the corresponding items in the relational database or fault model while preserving updates and links to those items made in the fault model. This mechanism also allows the personnel that are responsible for the fault model to control the timing of the release of updates to the fault model. Each change package effects information within a single fault model. All Change Packages in the system are stored in a set of relational tables with the properties shown in the FIG. 16 data dictionary for the change package entity 131. As noted in FIG. 16 this information includes active status and a time when a change package becomes active as well as the applicable equipment type or fault model.

Figure 17:
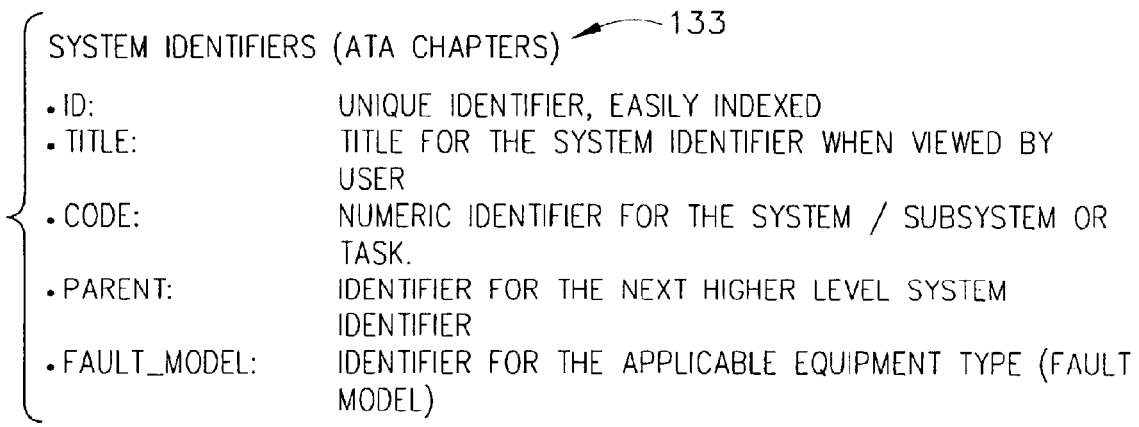

Further included in FIG. 1 is a categorical entity known as a System Identifier entity 133. System identifiers (Air Transport Association chapters for aircraft) are used to divide the complex system or top-level assembly (a piece of equipment) into its component systems and subsystems. System Identifiers are used to help the user find information in the fault model. System Identifiers are organized hierarchically so that a piece of equipment contains several systems, each system contains several subsystems and each subsystem contains several tasks. All System Identifiers in the system are stored in a set of relational tables with the properties depicted in the FIG. 17 data dictionary for the system identifier entity 133. As shown the data dictionary includes a code for the relevant system, subsystem, or task and an identifier for the next higher identifier as well as the applicable fault model.

Figure 18:
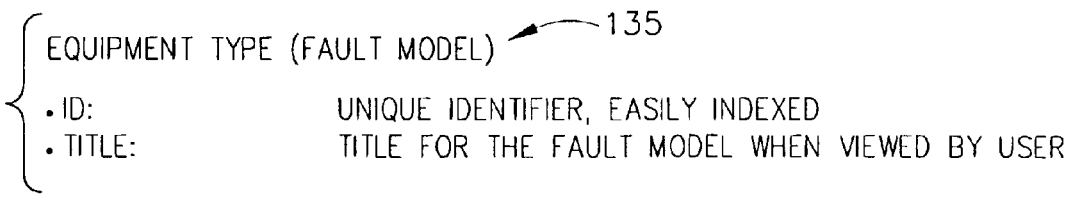

The final entity, shown in FIG. 1, is a categorical entity known as an Equipment Type entity 135 (a.k.a. Fault Models). This is a high level indication of equipment type, such as 757 or 767 airframes. This entity is used to identify the different types of equipment that are supported by the data in the relational database. All Equipment Type entities in the system are stored in a set of relational tables with the properties shown in the FIG. 18 data dictionary that includes a unique identifier and title for the fault model or equipment type.

Thus FIG. 1–FIG. 18 have shown a relational database and structure thereof for relating maintenance information that differs for each of a plurality of complex systems, such as aircraft, using a common database structure so as to facilitate maintenance procedures for the plurality of complex systems. The relational database or structure thereof comprises, as earlier noted, a plurality of primary entities for providing a fault model description of each of the plurality of complex systems, where the fault model description includes, for each of the plurality of complex systems, failure modes, symptoms and data required to effect a repair; and a categorical entity (equipment type entity or effectivity tags) corresponding to a complex system that enables selection of the fault model description corresponding to the complex system. The categorical entity preferably includes a complex system type and a set of tags that cross reference relevant information within the plurality of primary entities where this information corresponds to the complex system type. Advantageously, the common database structure provides a new fault model description for a new complex system by entering only new information corresponding to the new complex system in the plurality of primary entities and the categorical entity (s). Often the amount of new information is much less than the total amount of information.

The plurality of primary entities preferably includes an observation entity that further includes either or both user reported and automatically reported observations or indications of a problem indexed to an observation code. The plurality of primary entities further include a fault code entity including a fault code for each distinct set of observation codes that indicate a problem with a system or subsystem of the complex system. Basically the observations, however made, allow a fault classification that yields a fault code. The plurality of primary entities preferably further include a subsystem entity that includes a subsystem corresponding to one or more fault codes and one of a corresponding list of repairs, list of isolation procedures, and list of deferral procedures related to the subsystem. The subsystem entity is further arranged to provide for and consolidate a plurality of fault codes and when each fault code results in the same maintenance procedure the user is shown or the relational database otherwise indicates the maintenance procedure without the extra time required for resolving a specific fault code. The plurality of primary entities preferably further include an isolation entity including isolation procedures each having one or more outcomes. The plurality of primary entities further include an outcome entity having outcomes with each of the outcomes associated with one isolation procedure and one or more repairs wherein an interactive process of performing isolation procedures with resultant outcomes will resolve the one or more repairs to a specific repair. Note that operator interactions with the relational database is facilitated as preferably the categorical entity includes a thesaurus entity that facilitates a user's interface to the relational database by providing a relationship between words used interchangeably in complex system maintenance.

From a different perspective we have discussed a relational database for relating maintenance information that differs for each of a plurality of complex systems using a common database structure so as to facilitate maintenance procedures for the plurality of complex systems. The relational database comprises a categorical entity corresponding to a complex system that enables selection of a fault model description corresponding to the complex system; and a plurality of primary entities for providing the fault model description corresponding to the complex system selected according to the categorical entity from a plurality of fault model descriptions of the plurality of complex systems, where the plurality of fault model descriptions includes, for each of the plurality of complex systems, failure modes, symptoms and data required to effect a repair. The plurality of primary entities are arranged to facilitate classification of a fault condition and then fault isolation and repair procedures to correct the fault condition. The plurality of primary entities preferably further include one of a procedure entity, such as isolation or repair entity, and a document reference entity that correlate with known maintenance procedures.

Again here the categorical entity preferably further includes a thesaurus entity that facilitates conversion of unstructured user inputs into structured inputs suitable for the relational database or a change package entity that identifies a set of changes and controls when the set of changes becomes active for the complex system or models thereof.

Figure 19:
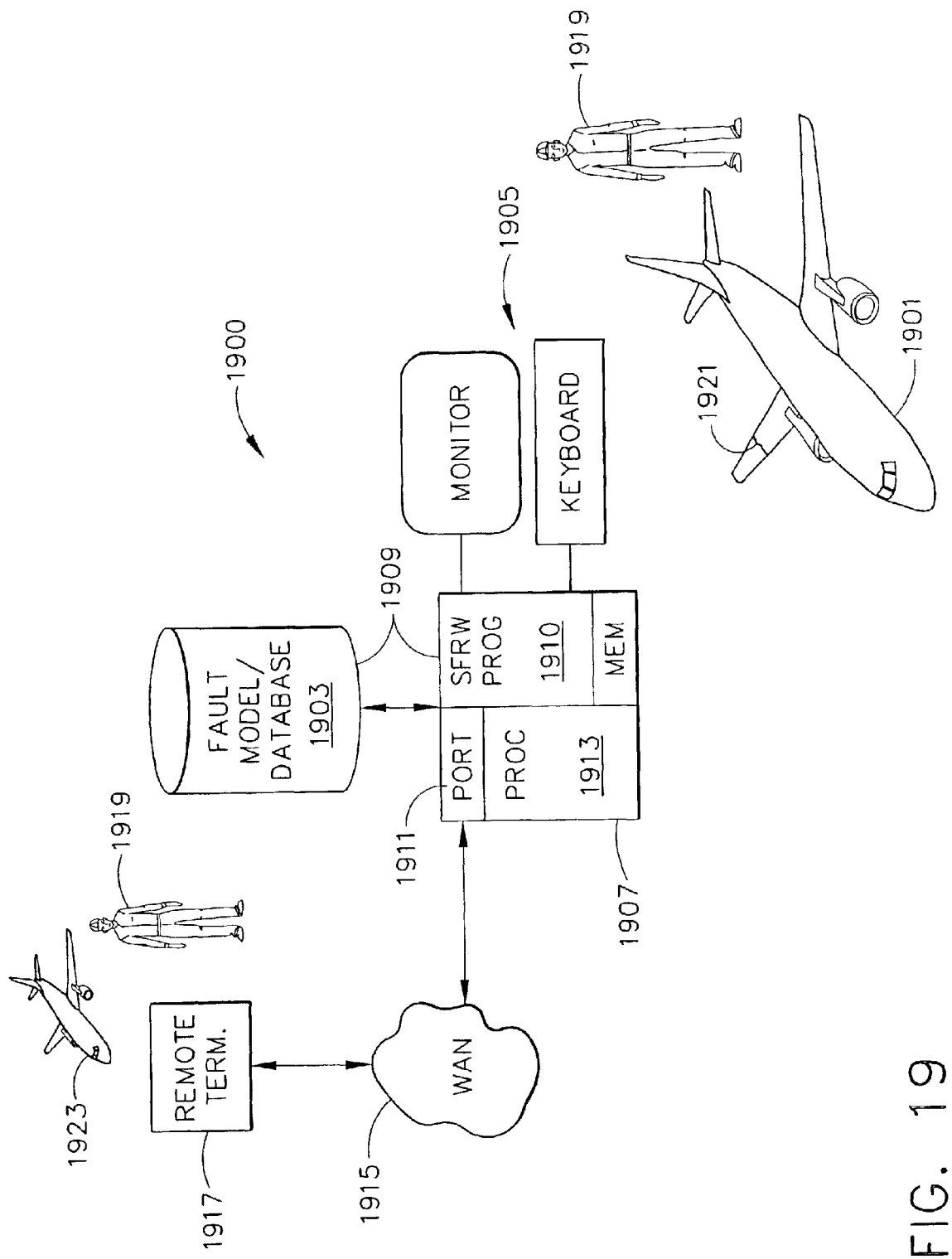
FIG. 19 depicts an exemplary system diagram of a preferred embodiment of an aircraft maintenance and diagnostic system according to the present invention.

FIG. 19 depicts, in an exemplary form, a functional block diagram of a preferred embodiment of a computer based aircraft maintenance and diagnostic system, in a contextual and exemplary environment, for facilitating maintenance activities in an aircraft or other complex systems. More particularly, an aircraft maintenance and diagnostic system 1900 for improved assistance with fault classification, isolation, and correction for a fault condition within an aircraft 1901 based on a relational database or fault model 1903 for the aircraft is shown. The system is computer based and includes a user interface 1905, such as a conventional keyboard and monitor and possibly means (not shown) for coupling to separate systems for downloading from the aircraft or other system failure mode or condition relevant data such as observed symptoms or test results. Further included is a known computer 1907 that is coupled to the user interface and has memory 1909 for storing software instructions 1910 and relational databases 1903 including the fault model and preferably a port 1911 and a processor 1913. The port is suitable for coupling to a Wide Area Network (WAN) 1915 such as the PSTN or Internet to provide access to the system 1900 from a remote terminal 1917. The processor 1913 executes the software program 1909 or instructions to process information to facilitate the identification and correction of the fault condition or failure mode within the aircraft 1901 according to the fault model defined by the relational database 1903. The relational database and structure thereof has been discussed above.

Generally the system 1900 is arranged and constructed so that a technician 1919 or maintenance and diagnostic personnel can make or collect observations and conduct tests relevant to a discrepancy 1921, using for example a test cart (not shown), and interact with the system via the user interface to arrive at the proper fault classification and isolation, thus repair and maintenance procedures and the like. Similarly a technician 1919 at the remote terminal 1917 or remote user could interact with the system 1900 and be provided diagnostic support there from in order to make appropriate fault isolations for remote aircraft 1923. In fact the aircraft may be partially analyzed or diagnosed at one site and finally diagnosed at another.

The processes, discussed above, and the inventive principles thereof are intended to and will alleviate problems, such as a multiplicity of relational databases each corresponding to a different complex system such as an airframe and possible inconsistent and time wasting maintenance activities and corrective actions or records thereof caused by prior art diagnostic, maintenance and service procedures. Using these relational database principles and concepts, delivery of maintenance service or repairs will be simplified and service and maintenance estimations, projections, and procedures and costs associated with inconsistent activities will be eliminated or significantly reduced.

Various embodiments of methods, systems, and apparatus for fault isolation with or without a corresponding fault model so as to facilitate and provide for consistent and cost effective maintenance and service programs for complex systems have been discussed and described. It is expected that these embodiments or others in accordance with the present invention will have application to many complex systems. The disclosed principles and concepts extend to these systems and specifically to methods employed for maintenance and service thereby and therein. This disclosure is intended to explain how to fashion and use various embodiments in accordance with the invention rather than to limit the true, intended, and fair scope and spirit thereof. The invention is defined solely by the appended claims, as may be amended during the pendency of this application for patent, and all equivalents thereof.

What is claimed is:

1. A relational database for relating maintenance information that differs for each of a plurality of complex systems using a common database structure so as to facilitate maintenance procedures for the plurality of complex systems, the relational database comprising:

a plurality of primary entities for providing a fault model description of each of the plurality of complex systems, said fault, model description including, for each of the plurality of complex systems, failure modes, symptoms and data required to effect a repair; and a categorical entity corresponding to a complex system that enables selection of the fault model description corresponding to the complex system, the categorical entity further including a complex system type and a set of tags that cross reference relevant information within said plurality of primary entities that correspond to said complex system type.

2. The relational database of claim 1 wherein the common database structure provides a new fault model description for a new complex system by entering only new information corresponding to said new complex system in said plurality of primary entities and said categorical entity.

3. The relational database of claim 1 wherein said plurality of primary entities further include an observation entity that includes one of a user reported and automatically reported indication of a problem indexed to an observation code.

4. The relational database of claim 3 wherein said plurality of primary entities further include a fault code entity including a fault code for each distinct set of observation codes that indicate a problem with a system of said complex system.

5. The relational database of claim 4 wherein said plurality of primary entities further include a subsystem entity that includes a subsystem corresponding to one or more fault codes and one of a corresponding list of repairs, list of isolation procedures, and list of deferral procedures.

6. The relational database of claim 5 wherein said subsystem entity is further arranged to consolidate a plurality of fault codes and when each fault code results in the same maintenance procedure indicating said maintenance procedure without resolving a specific fault code.

7. The relational database of claim 5 wherein said plurality of primary entities farther include a isolation entity including isolation procedures each having one or more outcomes.

8. The relational database of claim 7 wherein said plurality of primary entities further include an outcome entity having outcomes with each of said outcomes associated with one isolation procedure and one or more repairs wherein an interactive process of performing isolation procedures with resultant outcomes will resolve said one or snore repairs to a specific repair.

9. The relational database of claim 1 wherein said categorical entity further includes a thesaurus entity that facilitates a user's interface to the relational database by providing a relationship between words used interchangeably in complex system maintenance.

10. The relational database of claim 1 wherein the plurality of complex systems is a plurality of different aircraft.

11. A relational database for relating maintenance information that differs for each of a plurality of complex systems using a common database structure so as to facilitate maintenance procedures for the plurality of complex systems, the relational database comprising:

a categorical entity corresponding to a complex system that enables selection of a fault model description corresponding to said complex system; and a plurality of primary entities for providing said fault model description corresponding to said complex system selected according to said categorical entity from a plurality of fault model descriptions of the plurality of complex systems, said plurality of fault model descriptions including, for each of the plurality of complex systems, failure modes, symptoms and data required to effect a repair said plurality of primary entities facilitating classification of a fault condition and then facilitating fault isolation and repair procedures to correct the fault condition, and wherein the categorical entity further including a complex system type and a set of tags that cross-reference relevant information within said plurality of primary entitles that correspond to said complex system type.

12. The relational database of claim 11 wherein said plurality of primary entities further includes one of a procedure entity and a document reference entity that correlate with known maintenance procedures.

13. The relational database of claim 11 wherein said categorical entity further includes a thesaurus entity that facilitates conversion of unstructured user inputs into structured inputs.

14. The relational database of claim 11 wherein said categorical entity further includes a change package entity that identifies a set of changes for said complex system.

15. The relational database of claim 14 wherein said change package entity further controls when said set of changes becomes active for said complex system.

16. An aircraft maintenance and diagnostic system for assistance with fault correction for a fault condition within an aircraft based on a fault model for the aircraft, the system comprising in combination:

a user interface; a computer, coupled to the user interface, having a processor and memory for storing software instructions and a relational database:

said processor executing said software instructions to process information to facilitate the identification and correction of the fault condition within the aircraft according ta a fault model defined by said relational database;

said relational database for relating maintenance information that differs for each of a plurality of aircraft using a common database structure so as to facilitate maintenance procedures for the plurality of aircraft, the relational database comprising:

a plurality of primary entities for providing a fault model description of each of the plurality of aircraft, said fault model description including, for each of the plurality of aircraft, failure modes, symptoms and data required to effect a repair; and a categorical entity corresponding to the aircraft that enables selection of the fault model description corresponding to the aircraft, the categorical entity including an aircraft type and a set of tags that cross reference information within said plurality of primary entities that correspond to said aircraft type.

17. The aircraft maintenance and diagnostic system of claim 16 wherein said plurality of primary entities further include an observation entity that includes one of a user reported and automatically reported indication of a problem indexed to an observation code.

18. The aircraft maintenance and diagnostic system of claim 17 wherein said plurality of primary entities further include a fault code entity including a fault code for each distinct set of observation codes that indicate a problem with a system of said aircraft.

19. The aircraft maintenance and diagnostic system of claim 18 wherein said plurality of primary entities further include a subsystem entity that includes a subsystem corresponding to one or more fault codes and one of a corresponding list of repairs, list of isolation procedures, and list of deferral procedures.

20. The aircraft maintenance and diagnostic system of claim 19 wherein said subsystem entity is further arranged to consolidate a plurality of fault codes and when each fault code results in the same maintenance procedure indicating said maintenance procedure without resolving a specific fault code.

21. The aircraft maintenance and diagnostic system of claim 20 wherein said plurality of primary entities further includes an isolation entity including isolation procedures each having one or more outcomes.

22. The aircraft maintenance and diagnostic system of claim 21 wherein said plurality of primary entities further include an outcome entity having outcomes with each of said outcomes associated with one isolation procedure and one or more repairs wherein an interactive process of performing isolation procedures with resultant outcomes will resolve said one or more repairs to a specific repair.

23. The aircraft maintenance and diagnostic system of claim 16 wherein said categorical entity further includes a thesaurus entity that facilitates a user's interface to the relational database by providing a relationship between words used interchangeably in aircraft maintenance.

* * * * *